(12) United States Patent
Berghammer

(10) Patent No.: US 10,377,434 B2
(45) Date of Patent: Aug. 13, 2019

(54) TRAILER TRAIN HAVING A LIFTING DEVICE

(71) Applicant: LR Intralogistik GmbH, Woerth an der Isar (DE)

(72) Inventor: Fritz Berghammer, Landshut (DE)

(73) Assignee: LR Intralogistik GmbH, Woerth an der Isar (DE)

( * ) Notice: Subject to any disclaimer, the term of this patent is extended or adjusted under 35 U.S.C. 154(b) by 0 days.

(21) Appl. No.: 15/735,336

(22) PCT Filed: Jul. 29, 2016

(86) PCT No.: PCT/EP2016/068213
§ 371 (c)(1),
(2) Date: Dec. 11, 2017

(87) PCT Pub. No.: WO2017/032551
PCT Pub. Date: Mar. 2, 2017

(65) Prior Publication Data
US 2018/0170468 A1 Jun. 21, 2018

(30) Foreign Application Priority Data
Aug. 24, 2015 (DE) .................... 20 2015 104 465 U

(51) Int. Cl.
*B62D 63/06* (2006.01)
*B62D 53/00* (2006.01)
*B62B 5/00* (2006.01)

(52) U.S. Cl.
CPC ......... *B62D 63/062* (2013.01); *B62D 53/005* (2013.01); *B62D 63/061* (2013.01); *B62D 63/064* (2013.01); *B62B 5/0079* (2013.01)

(58) Field of Classification Search
CPC .. B62B 5/0079; B62D 53/005; B62D 63/061; B62D 63/062; B62D 63/064
See application file for complete search history.

(56) References Cited

U.S. PATENT DOCUMENTS

2002/0119876 A1* 8/2002 Lu ................... B31D 5/0047
493/350
2015/0225082 A1* 8/2015 Levron .................... B64D 9/00
244/137.1

FOREIGN PATENT DOCUMENTS

| DE | 202009001933 U1 | 6/2009 |
| DE | 202013001255 U1 | 5/2013 |
| EP | 2161182 A2 | 3/2010 |
| EP | 2808234 A1 | 12/2014 |

* cited by examiner

*Primary Examiner* — James A Shriver, II
*Assistant Examiner* — James J Triggs
(74) *Attorney, Agent, or Firm* — The Webb Law Firm

(57) ABSTRACT

A tugger train trailer including a support frame configured as a transport material cart entrained in a trailer train, which has a chassis with at least two wheels, and a lifting device configured to adjust the height of at least part of the support frame relative to the wheels. The lifting device may include at least one rotatable eccentric disc, which is supported on a cam roller. The eccentric disc may be installed on a shaft that is driven in rotation. The cam roller may be mounted on the support frame or a part of the support frame.

10 Claims, 5 Drawing Sheets

TRAILER TRAIN HAVING A LIFTING DEVICE

CROSS-REFERENCE TO RELATED APPLICATIONS

Figure 1:
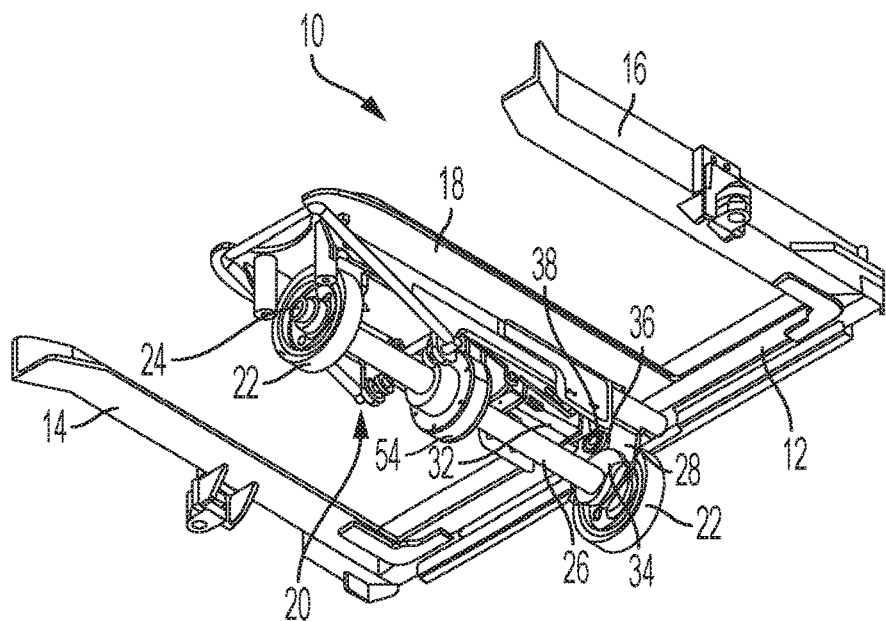

This application is the United States national phase of International Application No. PCT/EP2016/068213 filed Jul. 24, 2016, and claims priority to German Utility Model Application No. 20 2015 104 465.8 filed Aug. 24, 2015, the disclosures of which are hereby incorporated in their entirety by reference.

BACKGROUND OF THE INVENTION

Field of Invention

This invention relates to a tugger train trailer having an adjustable-height support frame or support frame part.

Description of Related Art

Tugger train trailers of this type are increasingly used in the automated series manufacturing of products, such as motor vehicles, for example, where the individual work stations are supplied with the necessary components by means of tugger trains or trailer trains. In a trailer train, a traction vehicle tows a plurality of tugger train trailers on which the required individual parts are transported. As a rule, these parts are delivered on pallets or in wire mesh boxes which are moved over short distances on transport cars (trolleys).

The invention is based on tugger train trailers with support frames, all or part of which can be lifted by means of built-in lifting devices relative to the wheels of the chassis to prevent the steering wheels of the trolley from rolling on the floor during transport inside the plant and negatively affecting the traction behavior. Examples of this prior art are disclosed in European Patent EP 2 161 182 B1 that includes a support frame that is in the shape of an E when viewed from overhead and German utility model DE 20 2009 001 933 U1 that includes a C-shaped support frame.

EP 2 808 234 A1 describes a variant in which, to lift the trolley, the entire support frame is not moved vertically but only a part of it, in this case a center bracket on which the trolley is supported.

It is known that pneumatic or hydraulic work cylinders can be used for the lifting device. However, pneumatic lifting mechanisms require a compressor that demands a great deal of energy and has the additional disadvantage that it is relatively noisy. Hydraulic lifting mechanisms have a significantly higher efficiency than pneumatic lifting mechanisms although they also have the disadvantage that the hydraulic medium is oil, which results in major contamination in the event of leaks.

Therefore, the transition is frequently made to lifting devices that have electrically driven spindles, although satisfactory levels of efficiency cannot be achieved on account of friction losses in the thread.

SUMMARY OF INVENTION

The object of the invention is to make available a tugger train trailer including the lifting device of which is significantly more efficient than known systems, to lift the support frame or part of the support frame together with the trolley on the support frame above the wheels of the chassis.

To accomplish this object, the invention teaches that the lifting device includes at least one rotatable eccentric disc that is supported on a cam roller.

The eccentric disc can thereby be located on a shaft that is driven in rotation. The cam roller is preferably mounted on the support frame or a part of it. In a kinematic inversion, it is also possible to mount the eccentric disc so that it can rotate on a stationary journal and to install the cam roller on the support frame or on a part of it. In that case the rotationally driven shaft can be omitted.

A lifting device according to the invention has significant advantages over similar devices of the prior art because it does not require hydraulic fluid under pressure and has friction losses that are negligible compared to spindle drives, so that here, too, significantly higher efficiencies can be achieved.

In one development of the invention, the wheel axle, which is generally in the form of a rigid axle, is mounted in the shaft that is driven in rotation. In the case of an E-shaped frame, the chassis located in the middle has a tube that forms the shaft, to which an eccentric disc is fastened, preferably on both ends, which eccentric disc, during the rotation of the tube, moves vertically relative to the cam roller and, thereby, lifts the support frame or a part of it above the wheel axle.

The invention can also be used with C-shaped support frames that have, on each of the four corners, a joint of the chassis with a wheel axle, which is mounted in its own tube to which the eccentric disc is fastened.

In the case of an E-shaped support frame, the shaft carries an eccentric disc on each of its two ends, while in its middle area a gear wheel is fastened that meshes with a pinion driven by a motor. The motor is generally in the form of an electric motor and is installed underneath a cross member that holds the chassis of the support frame so that it can move vertically.

In this embodiment, the two ends of the shaft are preferably mounted so that they can rotate and are vertically adjustable in a vertical cheek of the cross member on which the cam roller, on which the eccentric disc is supported, is also mounted.

In one alternative, the cam rollers are mounted on two lateral legs of a horizontal support table that holds the materials transport car and forms the adjustable-height part of the support frame.

It is particularly advantageous if the eccentric disc is configured so that its external periphery, starting from an arc-shaped notch that has the radius of the cam roller, has a steadily increasing radius. In this manner, the rotatable eccentric disc has two terminal positions: a lowered terminal position in which the cam roller is engaged in the arc-shaped notch, and a raised position in which the tip of the external periphery comes to rest on the cam roller.

BRIEF DESCRIBTION OF THE DRAWINGS

Figure 2:
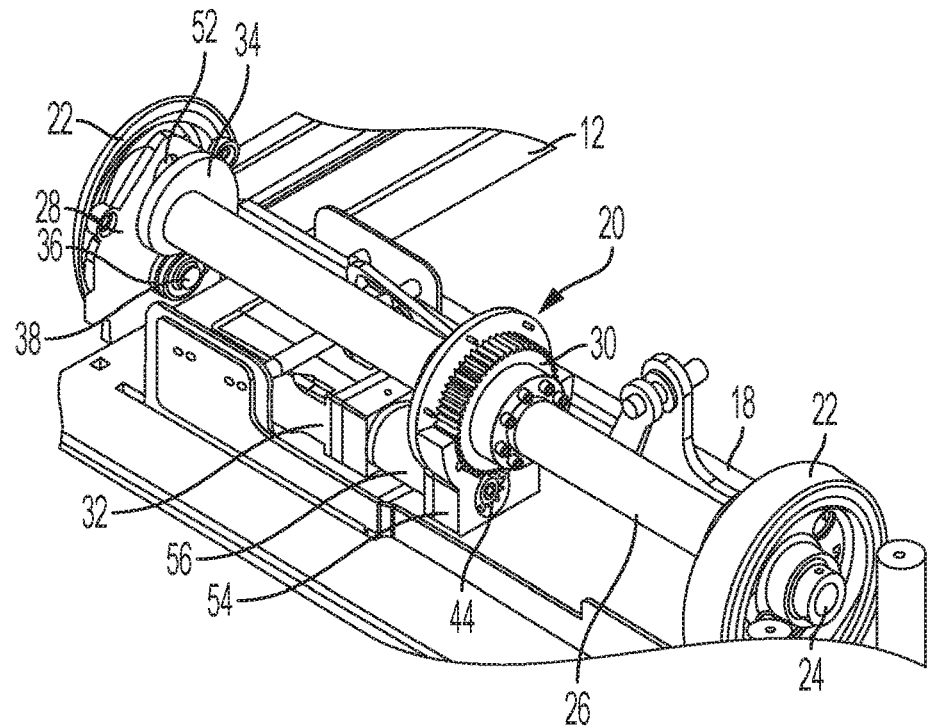
Figure 3:
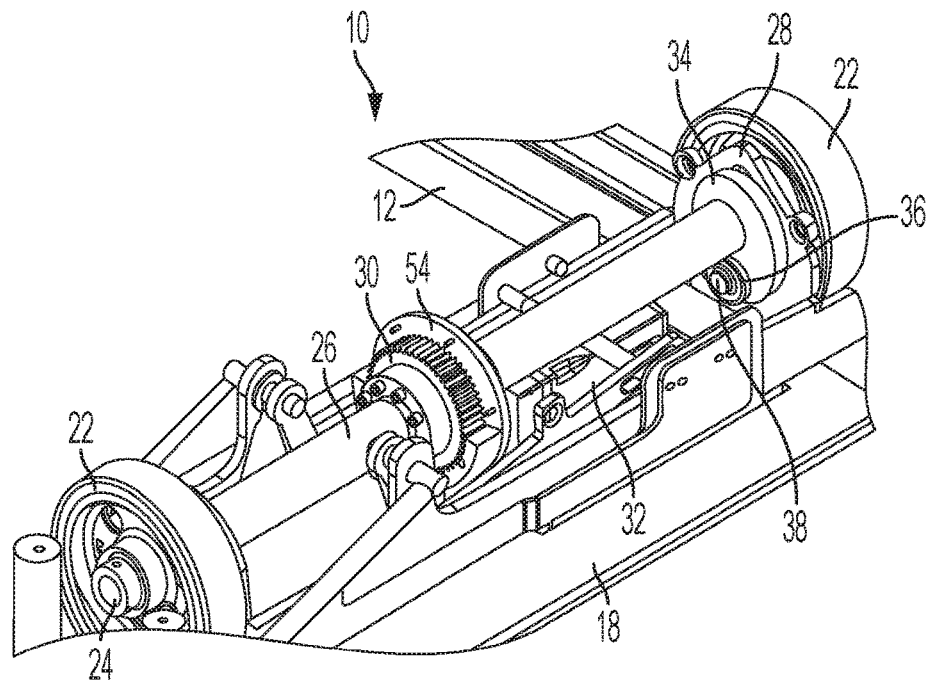
Figure 4:
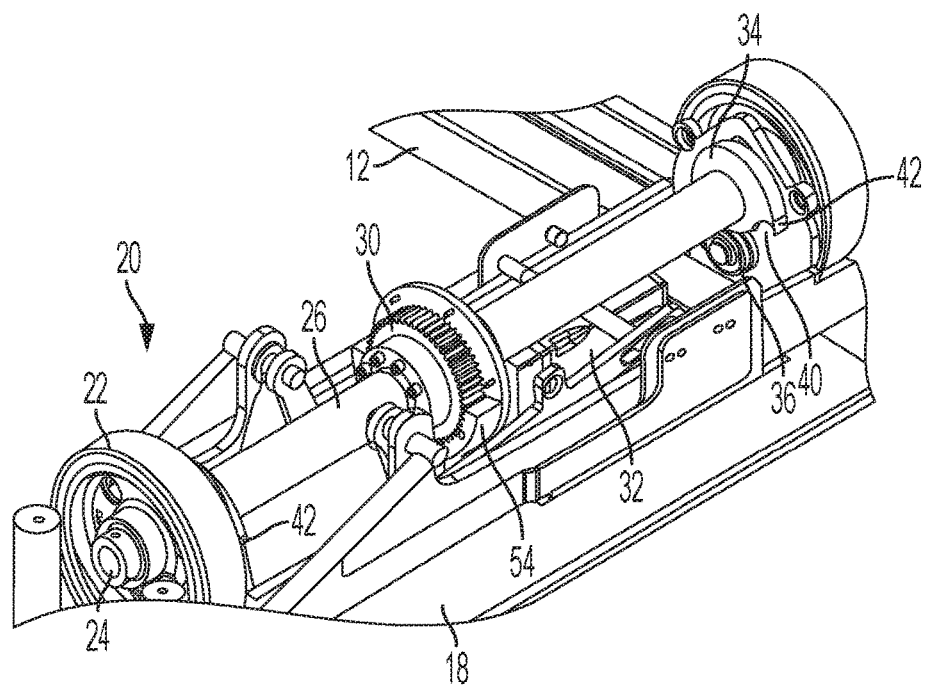
Figure 5:
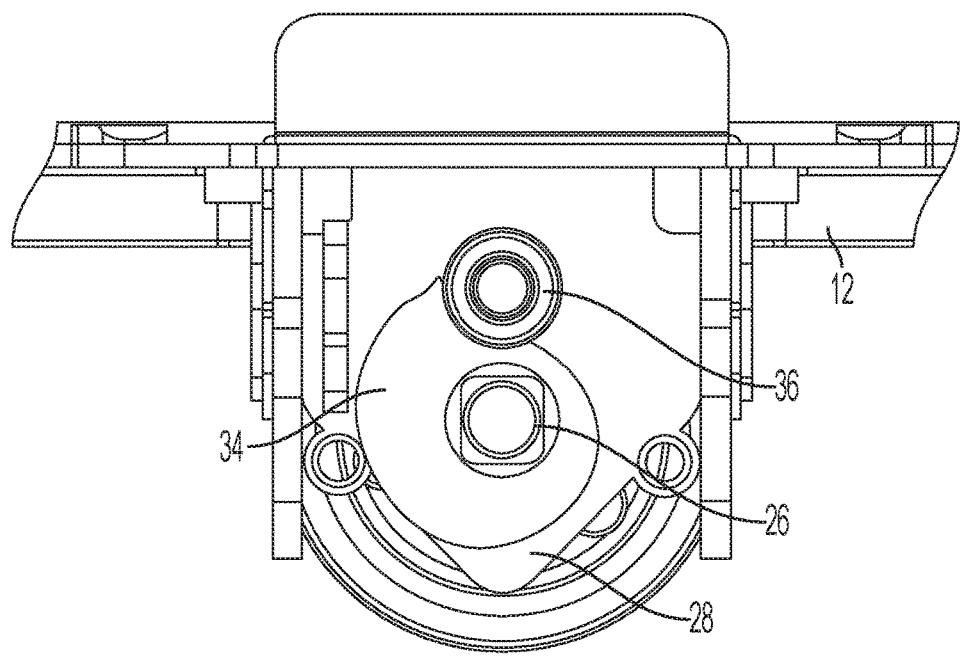
Figure 6:
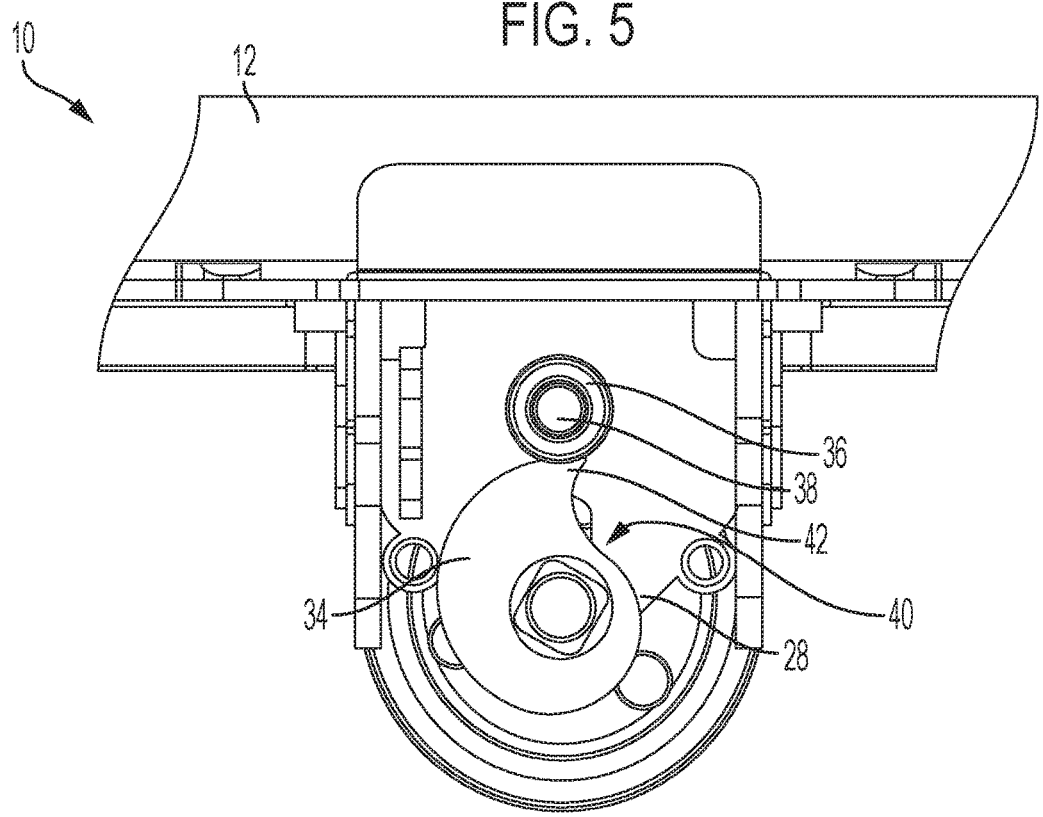
Figure 7:
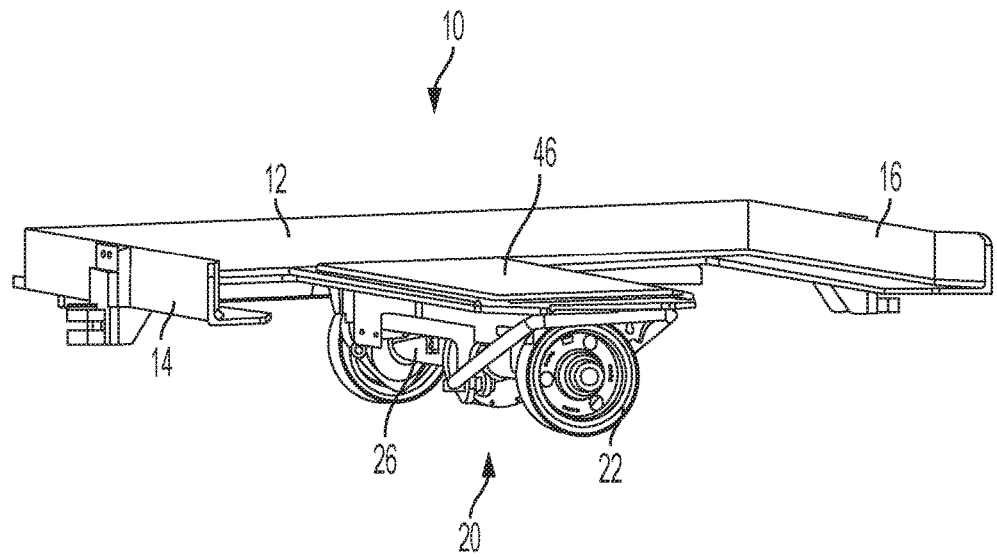
Figure 8:
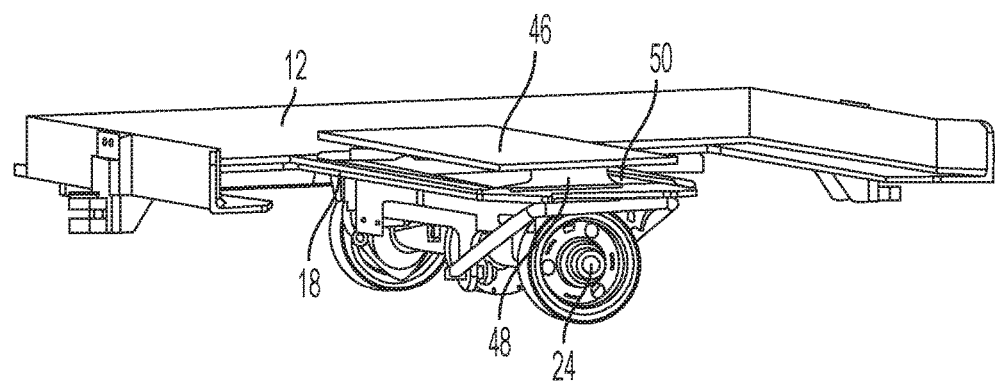
Figure 9:
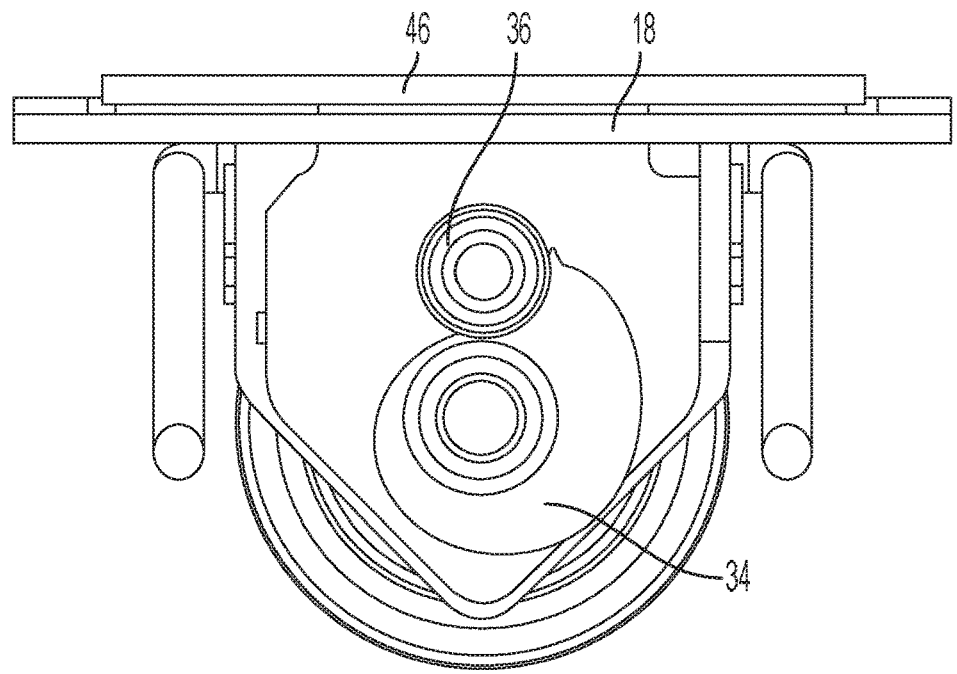
Figure 10:
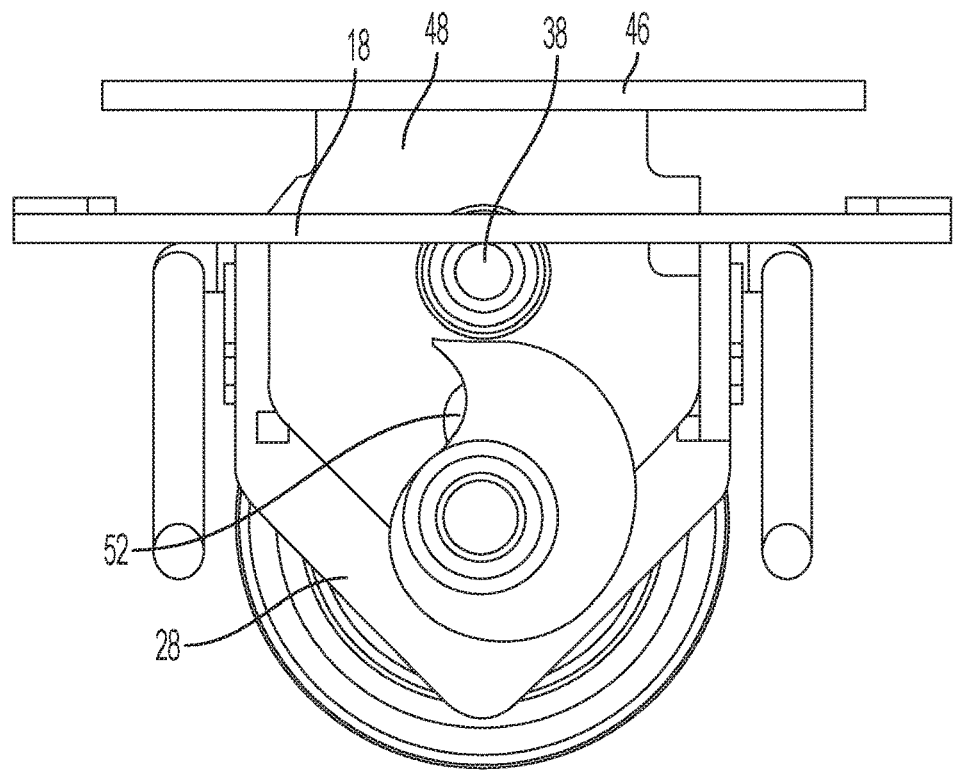

The invention is explained below on the basis of two exemplary embodiments that are illustrated in the accompanying drawings, in which:

FIG. 1 is a view from diagonally below of a tugger train trailer according to the invention, FIG. 2 is an enlarged view of an underside of a part of the single-axle chassis in FIG. 1 with the drive motor and the transmission for the tubular shaft, FIG. 3 shows the underside of the chassis illustrated in FIGS. 1 and 2 in the lowered position of the support frame, FIG. 4 is an illustration corresponding to FIG. 3 during the lifting of the support frame, FIG. 5 is a vertical section through the chassis in the fully lowered position of the support frame, FIG. 6 shows the fully raised position of the support frame, FIG. 7 is a view in perspective of a modified tugger train trailer in which only part of the support frame is vertically adjustable, FIG. 8 shows the support frame in FIG. 7 in the raised position of the support table, FIG. 9 is an enlarged sectional illustration of the support table illustrated in FIGS. 7 and 8 in the lowered position, and FIG. 10 shows the support table in the raised transport position.

In FIGS. 1 to 6, the invention is explained on the basis of an example of a support frame 10, which is in the shape of an E when viewed from overhead, in which two transverse spars 14 and 16 and a centrally located cross member 18 project from a lateral longitudinal spar 12. On the underside of the cross member 18, a chassis 20 with two lateral wheels 22 is installed in a known fashion, whereby the wheels 22 are mounted so that they can rotate on an axle 24.

The axle 24 is in the form of a rigid axle and is located in a shaft 26, which is in the form of a tube. The two ends of the shaft 26 can rotate in a slot 52 of a vertical cheek 28 and are mounted so that their height can be adjusted, whereby the cheek 28 projects downward from the cross member 18.

As shown in FIG. 2, a spur gear is fitted onto the middle of the shaft 26 and is engaged with a pinion 44, which is driven by a planetary gear train 56 by an electric motor 32. The motor 32 is non-detachably connected by means of the housing of the planetary gear train 56 with the transmission housing 54 of the gear wheel 30 and pinion 44 and is supported on the underside of the cross member 18 so that it can move vertically.

On each of the two ends of the tubular shaft 26, an eccentric disc 34 is fitted on and supported on a cam roller 36. For its part, the cam roller 36 is rotationally mounted on a horizontal axle stub 38, which projects from the cheek 28.

FIGS. 3 to 6 show that the eccentric disc 34, which is fastened to the respective end of the shaft 26, has an arc-shaped notch 40 with the radius of the cam roller 36. Starting from this notch 40, the outside circumference of the eccentric disc 34 has an increasing radius and ends in a tip 42 which, after a rotation of the eccentric disc 34, has its terminal position on the cam roller 36, as a result of which the support frame 10 together with the load resting on it has reached its highest position above the axle 24 of the chassis 20. Then, if the gear wheel 30 is rotated back by the motor 32—in the clockwise direction in FIG. 6—at the end of this rotational movement, the notch 40 is in contact with the cam roller 36, which is illustrated in FIG. 5, which shows the lowered position of the support frame 10.

The variants illustrated in FIGS. 7 to 10 also show an E-shaped support frame 10, from the longitudinal spar 12 of which a central cross member 18 with a chassis 20 projects. In this embodiment, however, the lifting device with its two eccentric discs 34 is not used to lift the entire support frame 10 but only part of it, which in this case is a horizontal support table 46 which is located above the cross member 18. Two lateral legs 48 project downward from the support table 46 and penetrate through corresponding openings 50 in the cross member 18. Mounted on each leg 48 is a cam roller 36 with which the eccentric disc 34 is in contact. When this eccentric disk 34 is rotated by the shaft 26 by the motor (not shown here) from the position illustrated in FIGS. 7 and 9 into the position illustrated in FIGS. 8 and 10, the eccentric disc 34 raises the support table 46 and the load resting on it into the transport position of the support frame 10.

FIG. 10 shows that a vertical slot 52 has been machined into the respective leg 48, through which the rigid axle 24 of the chassis 20 extends and in which the end of the shaft 26 is mounted so that it can move rotationally and vertically.

In one alternative of the lifting device, the eccentric disc 34 can be mounted on a stationary journal and supported on a cam roller 36, by which the support frame 10 or part of it is moved vertically.

As mentioned above, the invention can also be used on other support frames 10, for example on C-shaped frame with a total of four chassis 20.

The invention claimed is:

1. A tugger train trailer, comprising:
a support frame configured to receive a transport material cart entrained in a trailer train, which has a chassis with at least two wheels, and
a lifting device configured to adjust the height of at least part of the support frame, which supports the transport material cart, relative to the wheels,
wherein the lifting device includes at least one rotatable eccentric disc mounted on a shaft that is driven in rotation, wherein the at least one rotatable eccentric disc is supported on a cam roller.

2. The tugger train trailer as claimed in claim 1, wherein the cam roller is mounted on the support frame or a part of the support frame.

3. The tugger train trailer as claimed in claim 1, wherein the shaft is in the form of a tube in which an axle of the at least two wheels is mounted.

4. The tugger train trailer as claimed in claim 1, wherein an eccentric disc is fastened to each of the two ends of the shaft and, in a central area of the shaft, a gear wheel that is engaged with a pinion driven by a motor.

5. The tugger train trailer as claimed in claim 4, wherein the motor is connected by a transmission housing with a gear wheel and pinion with the shaft.

6. The tugger train trailer as claimed in claim 5, wherein the motor is installed between the shaft and a cross member of the support frame that holds the chassis.

7. The tugger train trailer as claimed in claim 6, wherein the two ends of the shaft are mounted so that the ends rotate and are vertically adjustable in a vertical cheek of the cross member.

8. The tugger train trailer as claimed in claim 7, wherein the cam rollers are mounted on the cheeks that are non-detachably connected with the cross member.

9. The tugger train trailer as claimed in claim 7, wherein the cam rollers are mounted on two lateral legs of a horizontal support table that holds the materials transport cart and forms the vertically adjustable part of the support frame.

10. The tugger train trailer as claimed in claim 1, wherein an outside circumference of the eccentric disc, starting from an arc-shaped notch with a radius of the cam roller, has an increasing radius at least over part of the outside circumference.

* * * * *

UNITED STATES PATENT AND TRADEMARK OFFICE
CERTIFICATE OF CORRECTION

PATENT NO. : 10,377,434 B2  
APPLICATION NO. : 15/735336  
DATED : August 13, 2019  
INVENTOR(S) : Fritz Berghammer Page 1 of 1

It is certified that error appears in the above-identified patent and that said Letters Patent is hereby corrected as shown below:

On the Title Page

Item (73), Column 1, Line 2, delete "lsar (DE)" and insert -- Isar (DE) --

In the Specification

Column 1, Line 9, delete "24," and insert -- 29, --

Signed and Sealed this  
Twenty-ninth Day of October, 2019

Andrei Iancu  
*Director of the United States Patent and Trademark Office*